United States Patent
Lein et al.

(10) Patent No.: US 6,416,847 B1
(45) Date of Patent: Jul. 9, 2002

(54) CROSS-LINKING TOP COAT FOR METALLIC ISLAND COATING SYSTEMS

(75) Inventors: Maureen M. Lein, Chester; Adam Murano, Derry, both of NH (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/380,535

(22) PCT Filed: Mar. 1, 1997

(86) PCT No.: PCT/US97/03155
§ 371 (c)(1),
(2), (4) Date: Apr. 3, 2000

(87) PCT Pub. No.: WO98/37985
PCT Pub. Date: Sep. 3, 1998

Related U.S. Application Data

(63) Continuation-in-part of application No. 08/576,072, filed on Dec. 21, 1995, now abandoned.
(60) Provisional application No. 60/002,812, filed on Aug. 25, 1995.

(51) Int. Cl.$^7$ .......................... B32B 15/08; B05D 5/06
(52) U.S. Cl. .......................... 428/209; 427/250; 427/258; 427/405; 427/409; 427/412.3; 427/412.4; 427/412.5; 428/31; 428/423.7; 428/424.4; 428/424.6; 428/424.7; 428/424.8; 428/425.8
(58) Field of Search .......................... 427/250, 258, 427/383.7, 388.1, 388.2, 405, 409, 412.3, 412.4, 412.5; 428/31, 142, 209, 423.7, 424.4, 424.6, 424.7, 424.8, 425.8

(56) References Cited

U.S. PATENT DOCUMENTS

| | | | |
|---|---|---|---|
| 2,992,125 A | 7/1961 | Fustier ........................ 428/458 |
| 2,993,806 A | 7/1961 | Fisher et al. | |
| 3,118,781 A | 1/1964 | Downing ..................... 428/458 |
| 3,632,557 A | 1/1972 | Brode et al. | |
| 3,666,835 A | * 5/1972 | Schloss ........................ 260/858 |
| 3,914,472 A | 10/1975 | Nakanishi et al. .......... 428/416 |
| 4,101,698 A | 7/1978 | Dunning et al. ............... 428/31 |
| 4,131,530 A | 12/1978 | Blum et al. ............. 204/192 C |
| 4,211,822 A | 7/1980 | Kurfman et al. | |
| 4,215,170 A | 7/1980 | Olivia | |
| 4,369,225 A | 1/1983 | Manabe et al. ............. 428/334 |
| 4,374,237 A | 2/1983 | Berger et al. ................. 528/28 |
| 4,407,871 A | 10/1983 | Eisfeller ....................... 428/31 |
| 4,431,711 A | 2/1984 | Eisfeller ....................... 428/31 |
| 4,645,816 A | 2/1987 | Pohl et al. | |
| 4,713,143 A | 12/1987 | Eisfeller ...................... 156/655 |
| 4,923,720 A | 5/1990 | Lee et al. | |
| 4,931,366 A | * 6/1990 | Mullaney, Jr. .............. 428/622 |
| 5,009,367 A | 4/1991 | Nielsen .......................... 239/3 |
| 5,027,742 A | 7/1991 | Lee et al. .................... 118/300 |
| 5,057,342 A | 10/1991 | Hoy et al. .................. 427/422 |
| 5,066,522 A | 11/1991 | Cole et al. .................. 427/422 |
| 5,106,650 A | 4/1992 | Hoy et al. ..................... 427/27 |
| 5,108,799 A | 4/1992 | Hoy et al. .................. 427/422 |
| 5,141,156 A | 8/1992 | Hoy et al. .................. 239/135 |
| 5,171,613 A | 12/1992 | Bok et al. ................... 427/422 |
| 5,178,325 A | 1/1993 | Nielsen .......................... 239/1 |
| 5,182,174 A | 1/1993 | Stephenson ................. 428/450 |
| 5,198,272 A | 3/1993 | Eisfeller ..................... 427/251 |
| 5,203,843 A | 4/1993 | Hoy et al. .................. 239/135 |
| 5,211,342 A | 5/1993 | Hoy et al. .................. 239/707 |
| 5,212,229 A | 5/1993 | Taylor et al. ............... 524/556 |
| 5,225,248 A | 7/1993 | Stephenson ................. 427/333 |
| 5,230,962 A | 7/1993 | Stephenson .............. 428/423.1 |
| 5,256,490 A | * 10/1993 | Pierce ........................ 428/458 |
| 5,286,569 A | 2/1994 | Werner, Jr. et al. ...... 428/423.1 |
| 5,290,625 A | 3/1994 | Eisfeller et al. ............. 428/216 |
| 5,320,869 A | 6/1994 | Eisfeller et al. ............. 427/250 |
| 5,354,808 A | 10/1994 | Onwumere et al. ......... 524/837 |
| 5,384,161 A | 1/1995 | Eisfeller et al. ............. 427/250 |
| 5,464,661 A | 11/1995 | Lein et al. ................... 427/409 |
| 5,468,518 A | 11/1995 | Lein et al. ................... 427/412 |
| 5,482,336 A | 1/1996 | Rouse et al. ................ 293/115 |
| 5,624,759 A | * 4/1997 | Usifer et al. .............. 428/424.2 |
| 5,711,993 A | 1/1998 | Lein et al. ................... 427/250 |
| 5,985,418 A | 11/1999 | Lein et al. ................... 428/195 |

OTHER PUBLICATIONS

*Thin film Phenomena*, Kasturi L. Chopra, Robert E. Kreige Publishing Company, Huntington, N.Y., 1979 p. 163–189, Month is Not Available.
*Handbook of Thin Film Technology*, Leon I. Maissel and Reinhard Glang, McGraw–Hill Book Company, New York, N.Y., 1970 p. 8–32–8–43, Month is Not Available.

\* cited by examiner

Primary Examiner—D. S. Nakarani
(74) Attorney, Agent, or Firm—Grossman, Tucker, Perreault & Pfleger, PLLC

(57) ABSTRACT

A metallized article and method for making the article, including a substrate having a polyurethane basecoat disposed thereon, with a layer of electrically discrete metallic islands of a corrosion prone metal disposed on the basecoat. A cross-linked polyurethane topcoat, containing an aminosilane, is further disposed on an encapsulates the discrete metallic islands.

16 Claims, No Drawings

CROSS-LINKING TOP COAT FOR METALLIC ISLAND COATING SYSTEMS

CROSS REFERENCE TO RELATED CASES

This application is a continuation-in-part of U.S. application Ser. No. 08/576,072, filed Dec. 21, 1995, now abandoned. This application also relies in part upon U.S. Provisional Application Ser. No. 60/002,812, filed Aug. 25, 1995.

BACKGROUND OF THE INVENTION

Electrically continuous thin metal layers or films, formed on rigid dielectric substrates by vacuum metallization, have been long used to give substrates a reflective metallic appearance. To slow corrosion of the metal layer, the layer was typically top coated with a clear, colorless dielectric polymeric coating. However, once the top coats are damaged or experience water infiltration, these metal films frequently experienced widespread corrosion of the metal layer.

More recently, electrically discontinuous metal layers have been developed which appear as continuous metal layers to the naked eye, which are less susceptible to widespread corrosion and which can be applied to flexible substrates. These electrically discontinuous layers consist of discrete metallic islands, which are vacuum deposited on the substrate, wherein the islands are separated by channels. These islands and channels are then top coated with a dielectric polymeric coating to separately encapsulate each island and to prevent corrosion of the metal islands. However, under weathering conditions the top coat has experienced water infiltration and/or a loss of adhesion (e.g., peel) from the metal islands and substrate in the channels.

To provide adequate adhesion of the top coat to the discontinuous layer, the metal layer has been etched with a caustic (e.g., sodium hyroxide solution) to remove metal deposited in the channels between the islands to provide a larger substrate surface area for bonding with the top coat. However, caustic etching can result in the formation of blackened areas in the metal layer.

Therefore, a need exists for a means of vacuum metallization of rigid and flexible substrates wherein the top coat will adhere to the metallized layer without etching, ad the side effects of etching, and wherein the top coat is less susceptible to water infiltration and loss of adhesion over time and with weathering.

SUMMARY OF THE INVENTION

This invention relates to a metallized article comprising a substrate, preferably having a polyurethane basecoat disposed thereon, with a layer of electrically discrete metallic islands of a corrosion prone metal disposed on the substrate. A crosslinked polyurethane top coat, containing an aminosilane, is further disposed on and encapsulates the discrete metallic islands.

The advantage of this invention is that it improves the bonding of polyurethane top coats to metal islands, deposited in a layer on a substrate, without caustic etching of the metal layer. This invention also has the advantage of increasing the hardness and the water impermiability of the top coat, by polymeric crosslinking, to further improve corrosion resistance.

DETAILED DESCRIPTION

The substrates of the present invention include any substrate upon which a reflective metallic coating is desirable. These substrates can be rigid or flexible. Further, these substrates and may or may not be electrically conductive.

Typically, substrates used in the present invention include vehicular/automotive trim applications, sheet stock, sports equipment, clothing and any other items suitable for decoration by inclusion of a reflective metallic surface.

Examples of suitable nonconducive (dielectric) substrates include a wide variety of plastic substrates which are dielectric materials (non-conductive) including thermoplastic materials, thermosetting materials and elastomeric materials, such as thermoset polyurethane, flexible elastomers which may be a natural or synthetic thermoplastic or thermoset polymer having an elongation of at least 30%, polyolefins, as polyethylene, polypropylene, polybutylene or a rubber/polypropylene blend, ABS (polyacrylonitrile-butadiene-styrene), thermoplastics as polyvinyl chloride, Surlyn (DuPont), polyester, polyester elastomer, and the like. Articles made of plastic substrates include, for example, automobile parts such as exterior moldings, bumper guards, dual pulls, mirror housings, grill headers, light bezels, gear shift bezels, door pulls, steering wheel emblems, and other exterior and interior automotive trim components. Other plastic articles can be used, for example in the plumbing trade, for household hardware applications, for home decoration, trucks, motor cycles and marine parts.

Examples of suitable conductive substrates include metals, such as aluminum, aluminum alloy, carbon steel, cast iron, brass, copper, nickel, nickel alloy, stainless steel, magnesium alloy and zinc based materials. Articles comprising metal substrates include, for example, faucets, knobs, handles, cutlery, files and blades, golf clubs and irons, hammers, jet blades, rifle barrels, skate blades, camera components and luggage. Preferably, the metal substrate is a vehicle wheel.

It is to be understood with respect to many of the metallic substrates used in the present invention, in particular for wheels, that these substrates may be pretreated prior to the present application process. Such pretreatment may optionally include picketing and/or the application of corrosion resistant coatings. Those corrosion resistant coatings can be phosphate corrosion resistant coatings or epoxy primers such as "E-coat", i.e., a cathodic electrocoat or a coating utilizing powder particles. With respect to aluminum and magnesium alloys, such a corrosion resistant coating may include well known chromium conversion coatings and the like.

It is also understood that an adhesion promoter may be applied to non-metallic substrates, such as chlorinated polyolefin to thermoplastic olefins. Typically, a coating thickness of about 0.1 mils to about 0.4 mils is applied.

The preferred substrates for the present invention are rigid substrates.

The metals that are used to form the layer of metallic islands are metals, or surface oxidized metals that will give a bright surface. Suitable metals are corrosion prone metals including tantalum, copper, silver, nickel, chromium, tin and aluminum and alloys thereof, and the like. Preferably, the metallic islands contain indium, indium alloys and/or indium oxides.

The layer of metallic islands is formed by depositing metal on the substrate, or coated substrate, by thermal evaporization, sputtering, ion plating, induction heating, electron beam evaporation and like methods. More uniform coverage is obtained, particularly around corners, edges or recesses if the metallization occurs in a chamber containing an inert gas such as argon.

The method for forming a layer of metallic islands, on a substrate, a treated substrate or a coated substrate, is described in U.S. Pat. Nos. 4,407,871 and 4,431,711 which are incorporated herein by reference.

Metallization produces a substrate that has a layer of discrete metallic islands deposited thereon. The discrete metallic islands are round in nature and have a thickness, or diameter, small enough to make the metallic film electrically non-conductive, as there are channels between the islands such that there is typically no conductivity between the islands, and alternately large enough to reflect enough light to make the coated article appear as a metal article to the naked eye. Typically, the thickness of the metallic islands will be between 25 and 4000 Angstroms (Å), preferably 500–3000Å. Most preferably, the thickness is between 500 Å–1200 Å.

In the present invention the layer of metallic islands on the substrate is encapsulated by a top coat. Preferably, a prime coat and/or basecoat was also applied to the substrate prior to metallization.

Typically, the coating composition for the prime coat, basecoat and/or top coat, after curing is a polyurethane or a polyester polyurethane. A resin suitable for forming basecoats and top coats useful in the present invention is described in Example 1.

To increase cross-linking of the polymer in the top coat and to at least partially improve adhesion to the metallized substrate, at least one organosilane is added to the top coat resin. A description of the use of organosilanes in resin top coats, for application to metal island layers, is described in U.S. patent application Ser. No. 08/576,072, files Aug. 25, 1996 now abandoned, which is incorporated in its entirety herein by reference.

At least one organosilane must be an organosilane that promotes crosslinking of the urethane in the top coat composition. The organosilane is preferably a secondary aminosilane and more preferably is bis-(gamma-trimethoxysilylpropyl)amine. The organosilane is reacted in the resin from which the base coat and top coat are made.

Preferably, the basecoat also contains the secondary aminosilane.

The purposes of the organosilane are to increase cross-liking of the polymer in the top coat, such as by end-capping free isocyanates in urthane prepolymers, to increase the hardness and hydrophobicity of the top coat, and to increase adhesion of the top coat to the metallized substrate.

In the embodiment wherein the organosilane is a secondary aminosilane, the ratio of aminosilane to free isocyanate in the coating utilized is typically between 1:1 to 1.2:1. Preferably, the aminosilane is added in excess, typically with a ratio of aminosilane to free isocyanate of between about 1.05:1 to 1.2:1. A suitable top coat containing an aminosilane is further described in Example 3.

In an alternate embodiment, the topcoat contains both an epoxy silane, such as gamma-glycidoxypropyltrimethoxy silane and a secondary aminosilane, such as bis-(gamma-trimethoxysilylpropyl)amine. For rigid substrates, the ratio of epoxy silane to aminosilane in the coating is typically between 1:20 to 1:5. Preferably, the ratio is 1:10.

For flexible substrates, the ratio of expoy silane to aminosilane in the topcoat is typically between 20:1 to about 5:1. Preferably, the ratio is 10:1.

The coating compositions, whether they be base coat and/or top coat is cured at a temperature that is high enough to completely cure the coating material but low enough such that the coating does not burn or significantly discolor. Typically, the coating is cured at a temperature range of approximately 150–375° F. for a period of time of 10 minutes to 70 minutes. The coating is preferably cured at a temperature between 250° F. to 300° F.

The thickness of the coating is typically between 1 mil to 5 mils. Preferably, the coating thickness is between 1.5 mils to 2.5 mils.

The method for applying a prime coat, basecoat, combined primer/basecoat or top coat composition, to a substrate or a layer of metallic islands, is described in U.S. Pat. Nos. 4,407,871, 4,431,711 and 5,468,518 which are incorporated herein by reference. Typical methods include spray coating, dip coating, flow coating and knife-over-roll coating.

Generally, a coating is applied in an organic solvent system wherein the organic solvent(s) comprise 40% to about 90% of the weight of the pre-cured coating composition. The urethane resin is typically 10% to 50% by weight of the pre-cured coating composition.

A wide variety of organic solvents can be utilized for the commercially available coating compositions, such as aromatic hydrocarbons, alkylesters, alcohols, ketones and dialkylethers. Preferably, the organic solvent is a solvent blend as is described in Examples 2 and 3.

The application of the coating system described herein is preferably performed by an airless spray gun. The coatings are applied to the substrate at ambient temperature and pressure.

In the application of the coating system to the substrate whether as a basecoat, primer coat or top coat, inorganic carriers, such as carbon dioxide, can be substituted for a portion or all of the organic solvent carriers. The method for applying a coating with a reduced amount of organic solvent is described in U.S. Pat. No. 5,464,661 which is incorporated herein by reference.

The Unicarb® System (Union Carbide) is a useful apparatus for replacing liquid organic solvent with $CO_2$ in spraying coatings in the present invention.

In the method of the present invention, the coatings are typically flashed for approximately 10 to 20 minutes to evaporate the solvents in the coating system and optionally by a curing step after application of each layer. Alternatively, it may be desired to apply another coating after the flashing of the solvent flashing has occurred. This can be characterized as a wet-on-wet system. All that is required after the first coating that is applied, that it is not fully cured. The substrate is in a handleable or tacky condition, prior to application of metal.

Optionally, additional amounts of pigment may be added for a prime or a basecoat in the amount of 0.1% to 40% by weight of the pre-cured (e.g., sprayable) coating composition. Preferably, the amount of pigment is between 20% to 30% by weight.

The invention will not be further and specifically described by the following examples.

EXAMPLE

Synthesis of Urethane Blend

Capralactone triol (491.3 lbs. of Stock No. PO305 from Union Carbide) and hydroxy terminated polysiloxane copolymer (14.7 lbs. of DC193 from Dow Corning) were added to a reactor which was then sealed and blanketed with nitrogen. While stirring, the contents of the reactor were heated up to a temperature of 220° F. over 15–20 minutes. Temperature was maintained below 250° F. while stirring. The nitrogen blanket purge was then secured and the reactor contents were subsequently dried under a vacuum.

After drying for an hour, the nitrogen purge of the reactor was restarted. Then, 253 lbs. of urethane grade toluene were added to the reactor over a 3–5 minute interval. After raising the reactor temperature to 220° F. over a ten minute interval, an additional 253 lbs. of toluene were added over a 3–5 minute interval to form Blend Component I.

Hexanediol adipate (240.2 lbs. of Fomrez 66–112 from Witco Chemical) was added to a second reactor, nitrogen blanketed and heated to 150° F. under agitation, the nitrogen blanket was then secured and the hexanediol adipate was dried under vacuum. After drying for an hour, the nitrogen purge was restarted. Over a 3–5 minute interval, 240.2 lbs. of toluene were added to the reactor, while maintaining the temperature at 150° F., to form Blend Component II.

The urethane blend was then formed from Blend Component I and Blend Component II. Initially, 753.36 lbs. of hydrogenated methylene diisocyanate (Desmodur W from Bayer) were added to a reactor. While stirring, and with nitrogen blanketing, 1.14 lbs. of dibutyl-10-dilaurate (Dabco 12 from Air Products) were added to the reactor. The nitrogen blanketing was then secured. After the reaction temperature reached 100° F., the reactor was cooled by injecting cold air into the reactor. Then, over a forty minute interval, 1012 lbs. of Blend Component I were added to the reactor. During a subsequent forty minute interval, 600 lbs. of toluene were added to the reactor.

Reactor cooling was secured and then the reactor was maintained at 100° F., with stirring, over a subsequent hour long interval.

Blend Component II (480.4 lbs.) was added to the reactor over a 5–10 minute interval while maintaining reactor temperature at 150° F. Then 153.4 lbs. of toluene were added to the reactor over a 3–5 minute interval after which the reactor was maintained at 150±° F. for an hour.

Additional toluene (750 lbs.) was then added to the reactor over a 5 minute interval, to form a urethane blend containing isocyanate terminated oligomer (40 wt. %) in xylene with a free NCO content typically between 3.3–3.6%. The urethane blend was further mixed for 15–20 minutes and then the reactor was blanketed with nitrogen.

EXAMPLE 2

Synthesis of a Crosslinking Resin

The cross-linking resin of the present invention was synthesized by reacting the urethane blend of Example 1 with a silane additive specifically bis-(gamma-trimethoxy silylpropyl) amine (Silquest A-1170 purchased from OSi Specialties, Danbury, Conn.). The reaction was performed in a 30 gallon reactor (nominal) with a low shear mixing blade, an inert atmosphere capability (nitrogen preferred), constant liquid addition at the stir shaft, temperature measurement and recording capability, and temperature control capability.

First, the urethane blend was analyzed for free % NCO by titrating, with 0.1N HCl, a mixture of 10 ml of 0.2N dibutylamine, 50 ml of isopropanol, 10 drops of bromocresol green indicator solution and 1 gram of the urethane blend of Example 1 dissolved in toluene. The 0.1N HCl was previously standardized by titrating an aqueous solution of tris hydroxymethyl-amino methane (Fisher No. T395)

An amount of urethane blend (19.0 gallons; 171 pounds; 77,634 grams) was then placed into the reactor and the actual weight was recorded. The reactor system was purged with nitrogen and stirring was begun at a moderate speed sufficient to allow for rapid dispersion of the silane additive into the urethane blend.

The amount of silane to be added was determined based on the actual weight of the resin placed in the reactor and the % free NCO as determined from the titration by using the following equations:

$$\text{Resin Equivalent Weight} = 4201.7/\% \text{ free NCO}$$

$$\text{Silane} = (\text{Actual Resin Weight}/\text{Resin Eq. Wt.}) \times 358.575$$

The silane was weighed into the addition apparatus and then sealed in the appropriate apparatus to prevent moisture entry.

The silane was then added to the urethane blend in the reactor at a rate that ensured the temperature did not exceed 140° F. and that the resin did not form any gel particles due to insufficient dispersion of the silane during addition. This reaction can be highly exothermic.

The temperature was recorded every two minutes until the reaction forming the cross-linking topcoat resin, from the silane additive and the urethane blend, was complete. When the silane addition was complete, the mixture was stirred for an additional twenty minutes. A sample was then removed and analyzed for free NCO. When the reaction is complete, the sample should contain no detectable free NCO. If the reaction was not complete, a second sample was analyzed after an additional twenty minutes stirring. This stirring and analysis was repeated at twenty minute intervals until no free isocyanate was measured.

When the reaction was complete, the resin was decanted into metal cans, purged with nitrogen and sealed.

EXAMPLE 3

Synthesis of Basecoat and Top Coat Compositions

The crosslinking basecoat resin, to be applied to the substrate in the present invention, was formed by mixing 23.6 grams of the cross-linking resin of Example 2 with 54.9 grams of a solvent blend (containing 62% solids) and 21.5 grams of a carbon-black containing polyester resin (3090 Tint Paste, purchased from PPG, containing 40% solids).

The solvent blend used contains 62.5 wt. % propylene glycol methyl ether acetate (PMA), 22.5 wt. % xylene, 10 wt. % dipropylene glycol methyl ether acetate (DPMA) and 5 wt. % of a blend of dibasic esters (purchased from Dupont) containing 55–65% dimethyl glutarate, 10–25% dimethyl adipate and 15–25% dimethyl succinate.

The cross-linking top coat, to be applied over the film of discrete metallic islands, was formed by mixing 32.5 grams of the crosslinking resin of Example 2 with 67.5 grams of the solvent blend and 1 gram of ultraviolet absorber (TINUVIN 328, Ceiba-Geigy).

EXAMPLE 4

Thermal Shock Testing of Crosslinking Top Coats

Aluminum wheels were metallized and then top coated with crosslinking top coat compositions containing different amounts of aminosilane. The top coat composition for two wheels contained an amount of aminosilane equivalent to 100% of the free isocyanate in the urethane blend (hereinafter "100% aminosilane top coat").

Two other wheels were coated with a top coat composition containing an amount of aminosilane equivalent to 105% of the free isocyanate in the urethane blend (hereinafter "105% aminosilane top coat").

The wheels underwent thermal shock testing, by standard automotive procedures, which included immersion in salt water at 40° C. for several hours, followed by dry exposure to −29° C. for several hours, and immediately thereafter by exposure to a stream of high pressure steam.

The results of the thermal shock tests showed that the 100% aminosilane top coat wheels experienced unacceptable loss to top coat adhesion and/or blistering while the 105% aminosilane top coat evidenced only slight adhesion loss.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

The invention claimed is:

1. A metallized article comprising:

a substrate;

a polyurethane base coat disposed upon said substrate;

a layer of electrically discrete metallic islands of a corrosion prone metal disposed on the surface of said base coat;

a cross-linked polyurethane top coat disposed on and encapsulating the discrete metallic islands, said top coat comprising an aminosilane;

wherein said polyurethane top coat comprises terminal isocyanate functional groups and said terminal isocyanate functional groups are end-capped by said aminosilane.

2. The article of claim 1 wherein said substrate comprises a dielectric substrate comprising thermoplastic materials or thermoset material.

3. The article of claim 2 wherein said thermoplastic material is selected from the group consisting of polyolefins, polyacrylonitrile-butadiene-styrene, poly(vinyl chloride), ionomer resins, polyester, and polyester elastomers.

4. The article of claim 2 wherein said substrate comprises plastic sheet stock.

5. The article of claim 2 wherein said substrate includes an adhesion promotor.

6. The article of claim 1 wherein said substrate comprises a conductive substrate.

7. The article of claim 6 wherein said conductive substrate is selected from the group consisting of aluminum, aluminum alloy, carbon steel, iron, brass, copper, nickel, nickel alloy, stainless steel, magnesium alloy and zinc based materials.

8. The article of claim 6 wherein said conductive substrate includes a corrosion resistant coating.

9. The article of claim 1 wherein said corrosion prone metal disposed on the surface of the base coat are selected from the group consisting of tantalum, copper, silver, nickel, chromium, in aluminum and alloys thereof.

10. The article of claim 1 wherein said polyurethane of said base coat or top coat comprises a polyester polyurethane.

11. The article of claim 1 wherein said aminosilane is a secondary amino silane or bis(gamma-trimethoxysilylpropyl)amine.

12. The article of claim 1 wherein the top coat is further comprised of an epoxy silane, wherein the ratio of epoxy silane to aminosilane in the coating is between 1:20 to 1:5.

13. The article of claim 1 wherein the top coat is further comprised of an epoxy silane wherein the ratio of epoxy silane to aminosilane in the coating is between 20:1 to 5:1.

14. A method for preparing a metallized article, comprising the steps of:

vacuum metallizing a substrate with a corrosion prone metal to produce a layer of discrete metallic islands on the substrate;

forming an aminosilane modified top coat composition, said top coat composition comprising polyurethane having terminal isocyanate functional groups, wherein said terminal isocyanate functional groups are end-capped by said aminosilane;

applying the top coat composition to the vacuum metallized substrate to form a top coat layer, and curing the top coat layer, whereupon a cross linked urethane polymer top coat is formed.

15. The method of claim 14 wherein the top coat is formed further comprising an epoxy silane and wherein the ratio of the epoxy silane to the aminosilane in the top coat is between about 1.20 to 1:5.

16. The method of claim 14 wherein the top coat is formed further comprising an epoxy silane wherein the ratio of the epoxy silane to the aminosilane in the top coat is between 20:1 to 5:1.

* * * * *